(12) United States Patent
Casey et al.

(10) Patent No.: US 10,229,572 B1
(45) Date of Patent: Mar. 12, 2019

(54) VEHICLE OCCUPANT DETECTION SYSTEM

(71) Applicants: Mark Casey, Olympia, WA (US); Elizabeth Casey, Olympia, WA (US)

(72) Inventors: Mark Casey, Olympia, WA (US); Elizabeth Casey, Olympia, WA (US)

( * ) Notice: Subject to any disclaimer, the term of this patent is extended or adjusted under 35 U.S.C. 154(b) by 0 days.

(21) Appl. No.: 15/623,183

(22) Filed: Jun. 14, 2017

(51) Int. Cl.
*G08B 21/02* (2006.01)
*B60N 2/00* (2006.01)

(52) U.S. Cl.
CPC ......... *G08B 21/0205* (2013.01); *B60N 2/002* (2013.01); *G08B 21/0283* (2013.01)

(58) Field of Classification Search
CPC  G08B 21/0205; G08B 21/0283; B60N 2/002; B60R 21/0132; B60R 21/01516; B60K 35/00; G01C 21/26; H04W 4/21; B60J 10/00
See application file for complete search history.

(56) References Cited

U.S. PATENT DOCUMENTS

| | | | |
|---|---|---|---|
| 7,082,359 B2 * | 7/2006 | Breed | G07C 5/008 701/31.5 |
| 7,106,203 B2 | 9/2006 | Edwards et al. | |
| 7,164,117 B2 * | 1/2007 | Breed | B60R 21/01516 250/208.1 |
| 7,421,321 B2 * | 9/2008 | Breed | B60C 11/24 340/442 |
| 7,920,102 B2 * | 4/2011 | Breed | B60K 35/00 340/991 |
| 8,058,983 B1 | 11/2011 | Davisson et al. | |
| 8,060,282 B2 * | 11/2011 | Breed | B60J 10/00 701/36 |
| 8,229,624 B2 * | 7/2012 | Breed | B60R 21/0132 701/36 |
| 9,008,854 B2 * | 4/2015 | Breed | G01C 21/26 701/1 |
| 9,102,220 B2 * | 8/2015 | Breed | B60R 21/0132 |
| 9,139,128 B1 | 9/2015 | Lemons | |

(Continued)

OTHER PUBLICATIONS

Mohamedaslam et al., A smart vehicle for accident prevention using wireless blackbox and eyeblink sensing technology along with seat belt controlled ignition system, 2016, IEEE, pp. 1-6 (Year: 2016).*

(Continued)

*Primary Examiner* — McDieunel Marc

(57) ABSTRACT

A vehicle occupant detection system including at least one weight sensing pad, at least one infrared sensor, and at least one motion sensor disposed within an automobile. Each of the at least one weight sensing pad, the at least one infrared sensor, and the at least one motion sensor is in operational communication with each of a battery and a computer system of the automobile. The computer system is configured to activate at least one of a horn, an alarm, an engine, at least one power window, a wireless communication with a remotely disposed fob, a wireless text communication with a remotely disposed personal electronic device, and a cellular communication with an emergency responder when at least one of the at least one infrared sensor, the at least one weight sensing pad, and the at least one motion sensor detects a passenger disposed within the vehicle.

3 Claims, 4 Drawing Sheets

(56) References Cited

U.S. PATENT DOCUMENTS 9,218,698 B2 * 12/2015 Ricci ............... H04W 4/21
9,317,983 B2 *  4/2016 Ricci ............... H04W 4/21
9,593,521 B2 *  3/2017 Breed .............. G01C 21/26

OTHER PUBLICATIONS

Adla et al., Automotive collision avoidance methodologies Sensor-based and ITS-based, 2013, IEEE, pp. 1-8 (Year: 2013).*
D'Orazio et al., Sensor networks on the car: State of the art and future challenges, 2011, IEEE, pp. 1-6 (Year: 2011).*
Fleming, Sensors? A Forecast [Automotive Electronics], 2013, IEEE, pp. 4-12 (Year: 2013).*

* cited by examiner

VEHICLE OCCUPANT DETECTION SYSTEM

BACKGROUND OF THE INVENTION

Various types of vehicle alert systems are known in the prior art. However, what has been needed is a vehicle occupant detection system including at least one weight sensing pad, at least one infrared sensor, and at least one motion sensor disposed within an automobile. What has been further needed is for each of the at least one weight sensing pad, the at least one infrared sensor, and the at least one motion sensor to be in operational communication with each of a battery and a computer system of the automobile. Lastly, what has been needed is for the computer system to be configured to activate at least one of a horn, an alarm, an engine, at least one power window, a wireless communication with a remotely disposed fob, a wireless text communication with a remotely disposed personal electronic device, and a cellular communication with an emergency responder when at least one of the at least one infrared sensor, the at least one weight sensing pad, and the at least one motion sensor detects a passenger disposed within the vehicle. The vehicle occupant detection system is thus uniquely structured to wire directly into a computer system of an automobile in order to prevent children and pets from being accidentally left in the automobile in extreme temperatures.

FIELD OF THE INVENTION

The present invention relates to vehicle alert systems, and more particularly, to a vehicle occupant detection system.

SUMMARY OF THE INVENTION

The general purpose of the present vehicle occupant detection system, described subsequently in greater detail, is to provide a vehicle occupant detection system which has many novel features that result in a vehicle occupant detection system which is not anticipated, rendered obvious, suggested, or even implied by prior art, either alone or in combination thereof.

To accomplish this, the present vehicle occupant detection system includes at least one weight sensing pad, at least one infrared sensor, and at least one motion sensor. The at least one weight sensing pad is disposed within a seat member of at least one seat of an automobile; the at least one infrared sensor is medially disposed on a dashboard of the automobile; and the at least one motion sensor is disposed on an interior roof of the automobile.

Each of the at least one weight sensing pad, the at least one infrared sensor, and the at least one motion sensor is in operational communication with each of a battery and a computer system of the automobile. The computer system has wireless capabilities and is configured to activate at least one of a horn of the automobile, an alarm of the automobile, an engine of the automobile, at least one power window of the automobile, a wireless communication with a remotely disposed fob having wireless capabilities, a wireless text communication with a remotely disposed personal electronic device having wireless capabilities, and a cellular communication with an emergency responder when at least one of the at least one infrared sensor, the at least one weight sensing pad, and the at least one motion sensor detects a passenger disposed within the vehicle after the engine of the automobile is turned off. The at least one weight sensing pad is optionally four in order that a single weight sensing pad is disposed under the seat member of each of four seats of the automobile. Furthermore, the at least one motion sensor is optionally two in order to sufficiently cover an interior of the automobile.

Preferably, the system will operate in a series of four steps: a) the horn of the automobile will sound several times after a passenger is detected within the automobile; b) the alarm of the automobile will sound and a text will be wirelessly communicated to a remotely located user's phone; c) the engine of the automobile will self-start, either the air conditioning or the heating system of the automobile will turn on, and the power windows will lower if the interior temperature of the automobile reaches a certain degree; and d) the automblie's cellular or wireless system will initiate a communication to an emergency responder and alert the emergency responder as to the location of the automobile.

The vehicle occupant detection system is uniquely structured to prevent the accidental unplugging of the system, since it is operationally connected directly into the computer system of the automobile. Moreover, the at least one infrared sensor prevents a false alarm from occurring with the at least one weight sensing pad since the at least one infrared sensor will prevent the false detection of a package or piece of luggage as a person. It is also envisioned that the system can be structured for use within a crib and a kennel.

Thus has been broadly outlined the more important features of the present vehicle occupant detection system so that the detailed description thereof that follows may be better understood and in order that the present contribution to the art may be better appreciated.

BRIEF DESCRIPTION OF THE DRAWINGS

FIGURES

Figure 1:
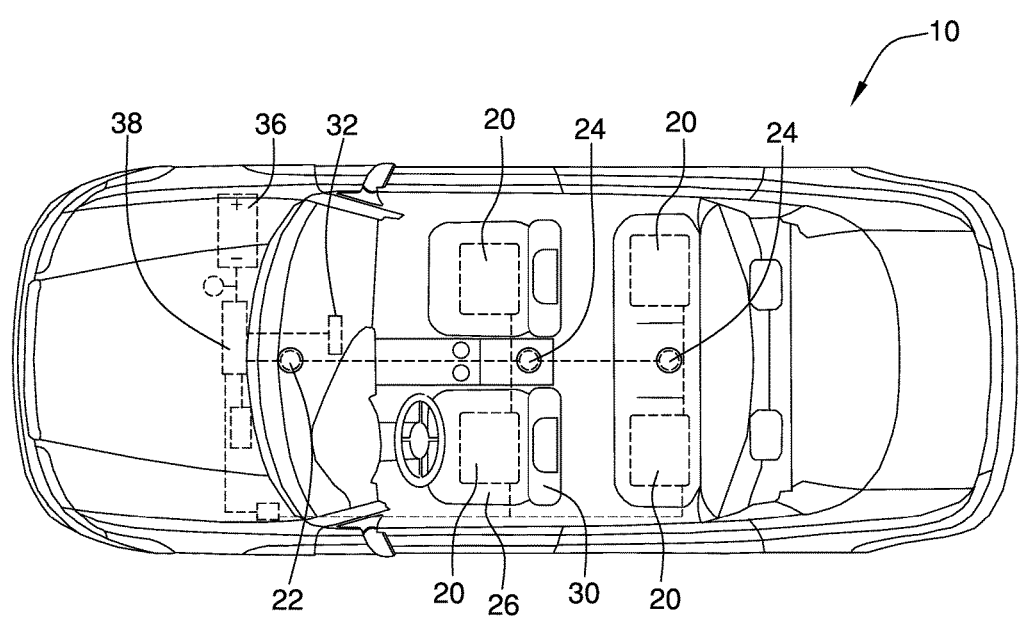

FIG. 1 is top plan view.

Figure 2:
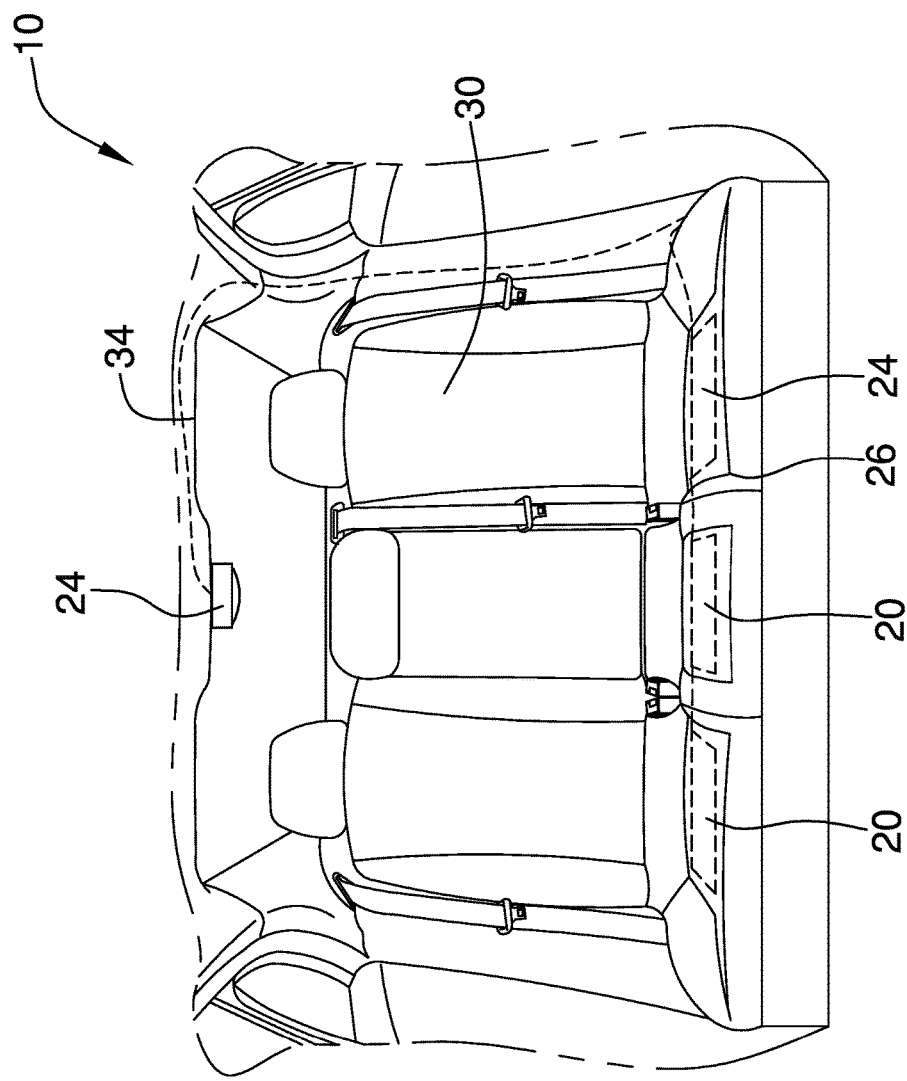

FIG. 2 is a front elevation view showing a plurality of weight sensing pads.

Figure 3:
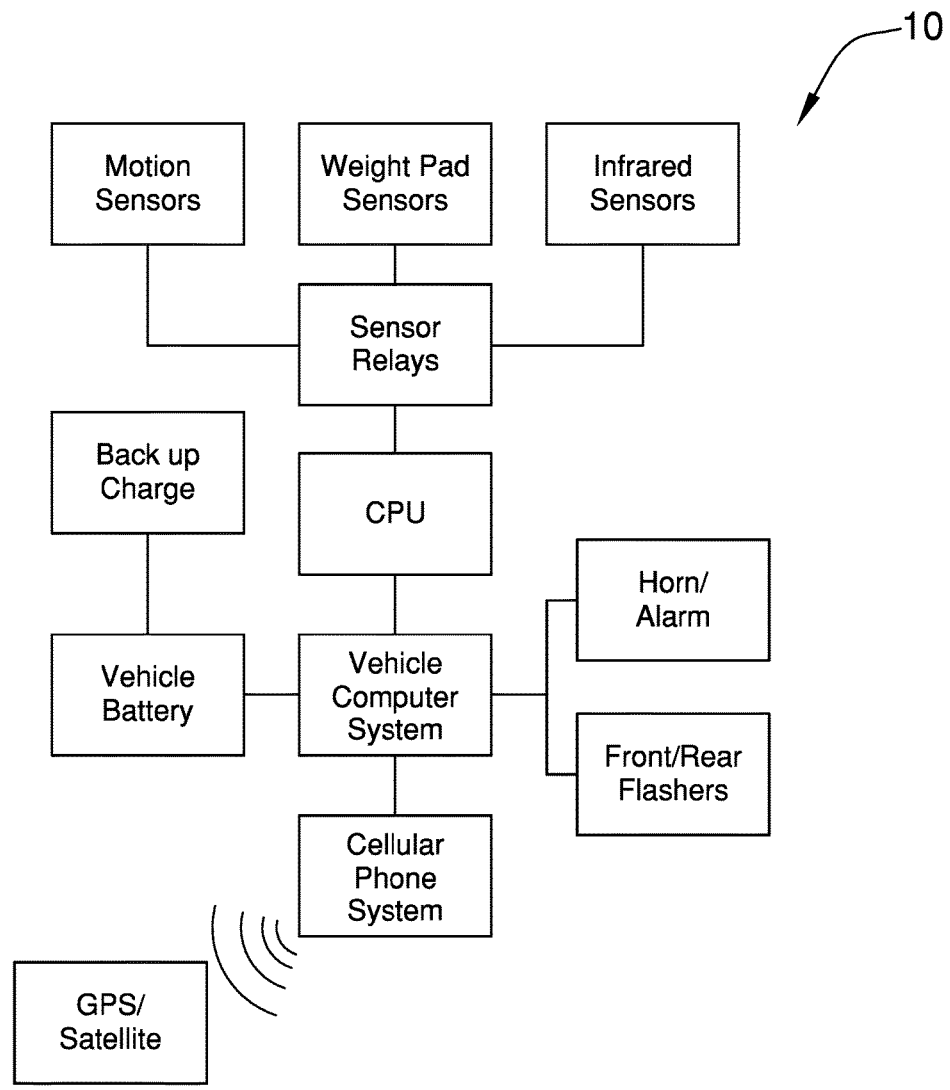

FIG. 3 is a block diagram of operational communications.

Figure 4:
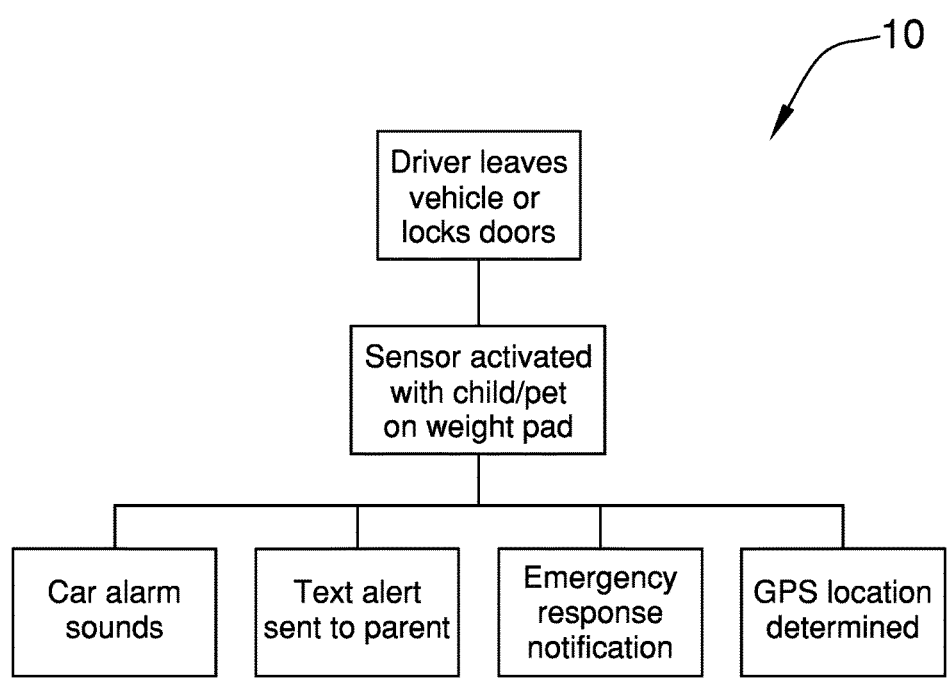

FIG. 4 is a flow chart of operations.

DETAILED DESCRIPTION OF THE DRAWINGS

With reference now to the drawings, and in particular FIGS. 1 through 4 thereof, an example of the instant vehicle occupant detection system employing the principles and concepts of the present vehicle occupant detection system and generally designated by the reference number 10 will be described.

Referring to FIGS. 1 through 4 the present vehicle occupant detection system 10 is illustrated. The vehicle occupant detection system 10 includes at least one weight sensing pad 20, at least one infrared sensor 22, and at least one motion sensor 24. The at least one weight sensing pad 20 is disposed within a seat member 26 of at least one seat of an automobile 30; the at least one infrared sensor 22 is medially disposed on a dashboard of the automobile 32; and the at least one motion sensor 24 is disposed on an interior roof of the automobile 34.

Each of the at least one weight sensing pad 20, the at least one infrared sensor 22, and the at least one motion sensor 24 is in operational communication with each of a battery 36 and a computer system of the automobile 38. The at least one weight sensing pad 20 is optionally four, and the at least one motion sensor 24 is optionally two.

What is claimed is:

1. A vehicle occupant detection system comprising:
at least one weight sensing pad disposed within a seat member of at least one seat of an automobile;
at least one infrared sensor medially disposed on a dashboard of the automobile; and
at least one motion sensor disposed on an interior roof of the automobile;
wherein each of the at least one weight sensing pad, the at least one infrared sensor, and the at least one motion sensor is in operational communication with each of a computer system and a battery of the automobile, wherein the computer system has wireless capabilities;
wherein the computer system is configured to activate at least one of a horn of the automobile, an alarm of the automobile, an engine of the automobile, at least one power window of the automobile, a wireless communication with a remotely disposed fob having wireless capabilities, a wireless text communication with a remotely disposed personal electronic device having wireless capabilities, and a cellular communication with an emergency responder when at least one of the at least one infrared sensor, the at least one weight sensing pad, and the at least one motion sensor detects a passenger disposed within the vehicle after the engine of the automobile is turned off.

2. The vehicle occupant detection system of claim 1 wherein the at least one weight sensing pad is four.

3. The vehicle occupant detection system of claim 2 wherein the at least one motion sensor is two.

* * * * *